(12) United States Patent
Garcia et al.

(10) Patent No.: US 9,579,567 B2
(45) Date of Patent: Feb. 28, 2017

(54) MANAGING CONTROLLER PAIRINGS

(71) Applicant: MICROSOFT TECHNOLOGY LICENSING, LLC, Redmond, WA (US)

(72) Inventors: Jonathan Garcia, Duval, WA (US); Matt Bielich, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 324 days.

(21) Appl. No.: 13/907,977

(22) Filed: Jun. 3, 2013

(65) Prior Publication Data
US 2014/0357372 A1 Dec. 4, 2014

(51) Int. Cl.
*A63F 13/23* (2014.01)
*A63F 13/22* (2014.01)
(Continued)

(52) U.S. Cl.
CPC ............ *A63F 13/22* (2014.09); *A63F 13/23* (2014.09); *A63F 13/30* (2014.09); *A63F 13/79* (2014.09)

(58) Field of Classification Search
CPC ........ A63F 13/20; A63F 13/21; A63F 13/214; A63F 13/215; A63F 13/22; A63F 13/23; A63F 13/235; A63F 13/40; A63F 13/42; A63F 2300/10; A63F 2300/1018; A63F 2300/1031; A63F 2300/20; A63F 2300/30; A63F 2300/40; A63F 2300/403; A63F 2300/404; A63F 2300/406; A63F 2300/55; A63F 2300/5546; A63F 2300/5553; A63F 13/533; A63F 13/537
See application file for complete search history.

(56) References Cited

U.S. PATENT DOCUMENTS 7,024,501 B1    4/2006 Wright
7,445,549 B1 *  11/2008 Best ............................... 463/32
(Continued)

OTHER PUBLICATIONS

World of Warcraft gameplay, https://www.youtube.com/watch?v=VufhWXi4K14, Dec. 1, 2010.*
(Continued)

*Primary Examiner* — Damon Pierce
(74) *Attorney, Agent, or Firm* — Gregg Wisdom; Judy Yee; Micky Minhas

(57) ABSTRACT

Example methods manage data that relates a user to a player slot and to a game controller. One example method operates in a multi-user computer environment that includes a game console and a game controller. The method may establish a first mapping and a second mapping for a game running on the console. The first mapping relates a generic player position to a user profile and the second mapping relates the user profile with a game controller. The mappings rely on mapping data provided to the game through a user interface available during the game. The method controls the game, as a function of the first mapping and the second mapping, to manage controller pairings to attribute actions performed at a controller with a currently mapped user profile and then to a player slot. Controller pairings may be managed while the game is in progress without interrupting a game experience.

12 Claims, 11 Drawing Sheets

(51) Int. Cl.
*A63F 13/79* (2014.01)
*A63F 13/30* (2014.01)

(56) References Cited

U.S. PATENT DOCUMENTS

| | | |
|---|---|---|
| 7,753,788 B2 | 7/2010 | Lum et al. |
| 2007/0111796 A1 | 5/2007 | Giaimo et al. |
| 2008/0082311 A1* | 4/2008 | Meijer .................. G06F 3/011 703/24 |
| 2010/0311483 A1* | 12/2010 | Fields .................. A63F 13/10 463/2 |
| 2011/0021271 A1 | 1/2011 | Ikeda et al. |
| 2011/0105231 A1 | 5/2011 | Ambinder et al. |
| 2011/0264701 A1* | 10/2011 | Wong .................. H04L 12/14 707/792 |
| 2013/0324244 A1* | 12/2013 | Mikhailov et al. ............ 463/31 |

OTHER PUBLICATIONS

Ruhnke, Ingo, "A Xbox/Xbox360 Gamepad Driver that Works in Userspace", Retrieved at <<http://pingus.seul.org/~grumbel/xboxdrv/xboxdrv.html>>, Mar. 26, 2011, pp. 45.

Marshall, Rick, "'Xbox 720', 'Durango' or Just 'the New Xbox': Here's What you Need to Know", Retrieved at <<http://www.digitaltrends.com/gaming/xbox-720-rumors-the-rumors-that-might-be-true/>>, Mar. 17, 2013, pp. 7.

"Pinnacle Game Profiler Features", Retrieved at <<http://pinnaclegameprofiler.com/features>>, Retrieved date: Mar. 25, 2013, pp. 2.

\* cited by examiner

MANAGING CONTROLLER PAIRINGS

BACKGROUND

Conventionally, a game had a concept of generic players or player slots. These slots may have been referred to generically as "player1" and "player2." Generic player1 got mapped to one controller when the game started and generic player2 got mapped to another controller when the game started. The mappings were done once at startup and were fixed for the duration of the game. The mappings may have been controlled by users. Changing the mappings required stopping the game experience, terminating a computer process running the game, and starting over. Once the game had started, and the generic player to controller relationship had been established, the game could then ask player1 questions like, "who are you," "is there a profile you would like to use," or "are you happy being generic player1?" Only then would the game establish a relationship between generic player1 and a user profile. The user profile could be used to customize the game experience, address billing issues, and facilitate other actions. If a human wanted to use a different controller than the one initially mapped, then the game had to be stopped, exited, and re-launched and a new fixed player-controller relationship established.

FIG. 1 illustrates how conventional systems map a player slot to a controller using a game table 100. FIG. 1 also illustrates how conventional systems map a player slot to a user profile using a user table 110. Both mappings involved the player slot. Both mappings were static and could not be changed without disrupting the gaming experience and terminating a process running the game. Both mappings were done once at game start up.

This conventional one-to-one approach arose because game consoles typically had a concept of a controller and a concept of a player slot and the only way to connect the player slot to the controller was through a sign-in procedure. All actions performed from a controller were associated with the user who entered their information from that controller and the only actions the user could perform were those associated with the controller on which the user signed in.

But computer systems, including game systems, have developed and may allow multiple users to access, sign in, or otherwise interact with the system at the same time with different types of controllers. For example, a single game console may have several controllers that are operably connected to the console, some wired and some wirelessly. Additionally, the game console may allow different players to have different games active at different times and even to come and go from a game. Thus the traditional, fixed, one-to-one relationship between a user and a controller may limit the game experience. This limiting of the experience may extend beyond games and game consoles to other multi-user systems that have multiple input devices.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods change how player slots, controllers, and users are related in a game context. Example methods operate in a multi-user computer environment that includes a game console and a set of game controllers operably connected to the game console. Example methods establish, in computer memory, a first mapping for a game that relates a generic player position associated with the game to a user profile. Example methods also establish, in computer memory, a second mapping that relates the user profile with a member of the set of game controllers. The mappings depend, at least in part, on mapping data provided to the game through a user interface that is available during game play. Example methods control the game, as a function of the first mapping and the second mapping, to manage controller pairings to facilitate attributing actions performed at a controller with a generic player position and a specific user profile.

Example apparatus may be configured with hardware including a processor and a memory for storing information that relates player slots, controllers, and users. The memory may store mapping data for managing a controller pairing. The hardware may include a set of logics that manage the controller pairing based, at least in part, on the mapping data. The set of logics may present a user interface for acquiring the mapping data and a mapping request and may manage the controller pairing as a function of the mapping data and the mapping request. The hardware may dynamically establish or re-establish mappings while a game is in progress and while allowing the game to continue.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
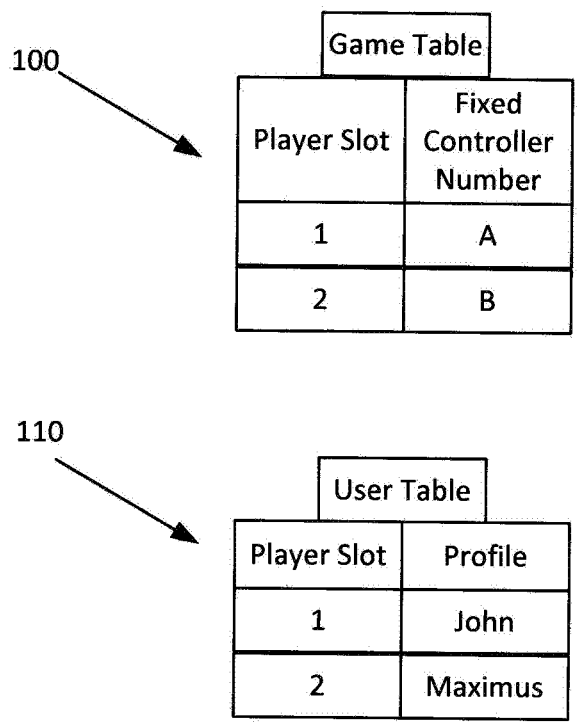
FIG. 1 illustrates conventional mappings for controller pairing.

Example apparatus and methods manage controller pairings by establishing dynamic, user-centric mappings instead of fixed, controller-centric pairings. Example apparatus and methods take the different user-centric approach when a computer game starts up and can modify mappings with a game in progress. A game may still have a concept of generic player slots. These generic slots may still be known as player1 and player2 and may extend to more than two players (e.g., player3 . . . playerN). However, example apparatus and methods may now map a player slot to a user and then map a user to a controller currently in use by that user. Example apparatus and methods may provide user interface elements (e.g., graphical user interface, physical controls, voice recognition, haptic recognition, gesture recognition) that facilitate providing information for establishing and managing the mappings. Unlike conventional systems, the mappings may be changed while the game is active, which allows the game to continue without disrupting the game experience or without terminating a process running the game.

Example apparatus and methods may present users with a system menu that can be invoked or accessed from a controller, from a console, or from another device associated with the game. The system menu allows a user to associate a controller with a user profile and to identify a current controller in use by the user. Since users may employ different controllers at different times during a game session, providing an interface that facilitates a user identifying a controller that they are currently using provides new flexibility.

Consider the following scenario: John sits down to play his favorite video game and picks up a first controller. After a while, Jane comes over and joins the game. Conventionally, it may have been difficult, if even possible at all, to add a player and to update her controller/slot/profile mapping. After playing together for a while, John and Jane may decide to swap controllers. Conventionally this may have been impossible. Later in the day, Jane's sister Jill may drop by. Jill may have the latest controller that Jane had ordered and that just arrived in the mail. Jane may want to use the controller in her current game session. Once again this may have been impossible in a conventional system. Conventionally, game systems have allowed multiple users but have had a fixed 1:1 relationship between a controller and a player during a session. This frustrates gamers like Jane because picking up the wrong controller, losing controller battery power during a game, or changing controllers during a game may produce undesirable results. For example, to accommodate any of the changes described in the above scenario, John and Jane might have to end the game, reconfigure the game, and start over. Gamers really don't like doing this. Gamers want a more flexible experience, especially in games that may last a long time and where players can come and go during the game. Additionally, as more sophisticated wireless controllers become available, either temporarily or permanently, the ability to switch between controllers during a game may provide the gamer with a richer experience. Example apparatus and methods facilitate changing controllers without requiring the obtrusive sign off, stop, restart, sign on process.

Figure 2:
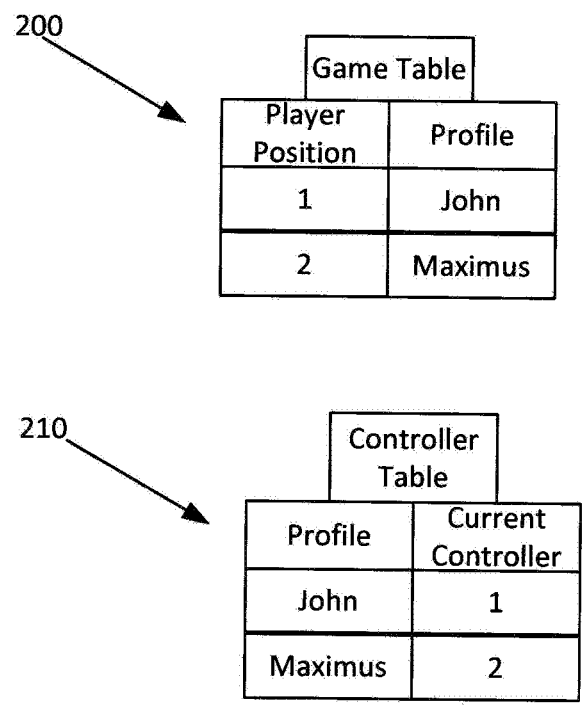
FIG. 2 illustrates example mappings for managing controller pairings.

Example apparatus and methods recognize that a multi-user system may have multiple users that may want to launch or otherwise interact with applications. Example apparatus and methods also recognize that users may have profiles that they want associated with an application or an action taken in an application. Thus, rather than tightly coupling a single user to a single controller, example apparatus and methods dynamically map users to profiles using, for example, a game table 200 (FIG. 2) and map users to controllers using, for example, a controller table 210 (FIG. 2).

Figure 9:
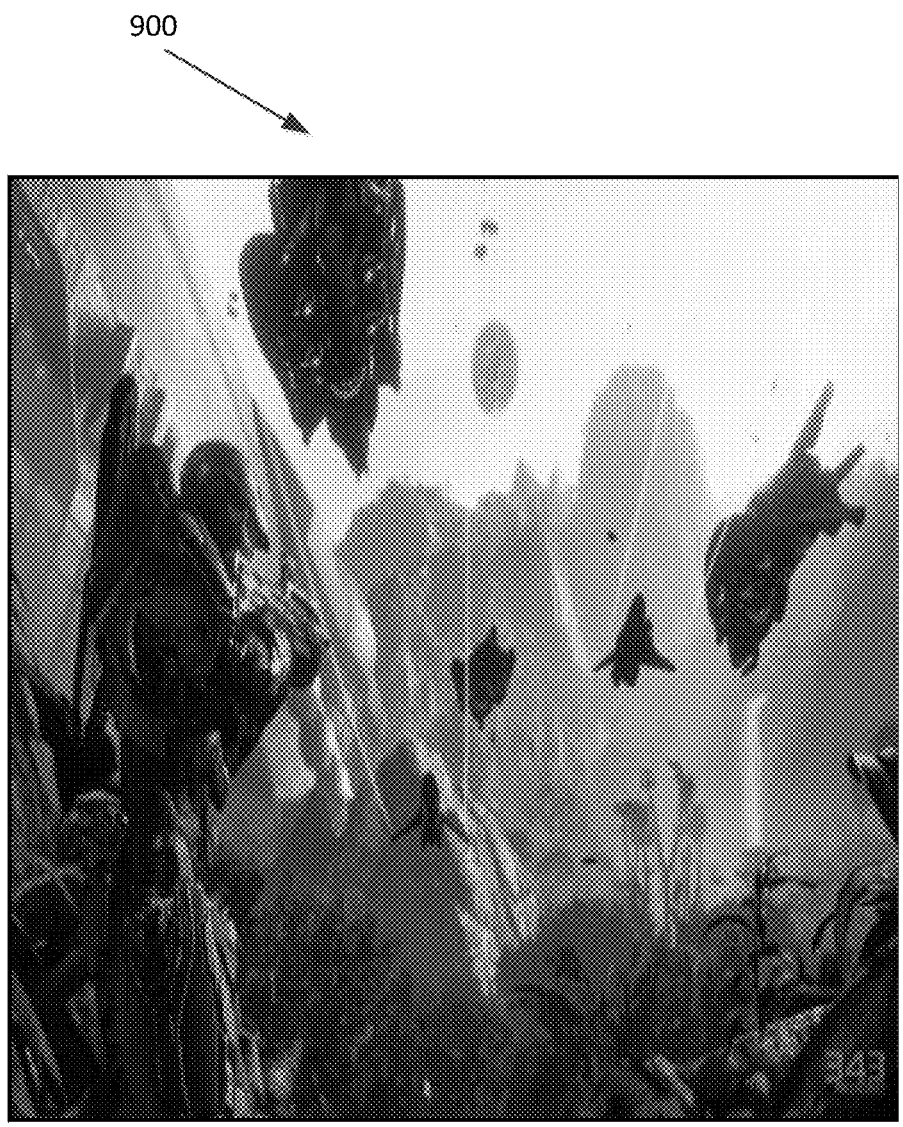
FIG. 9 illustrates an example screen shot from a video game.

FIG. 9 illustrates an example game screen 900 where a game is in progress. At some point, one of the gamers playing the game may want to change their controller association. Example apparatus and methods may provide a user interface element with which a user may interact to indicate their desire to change their association. The user interface element may be invoked using a graphical user interface action, using a voice command, using a gesture, or in other ways.

Figure 10:
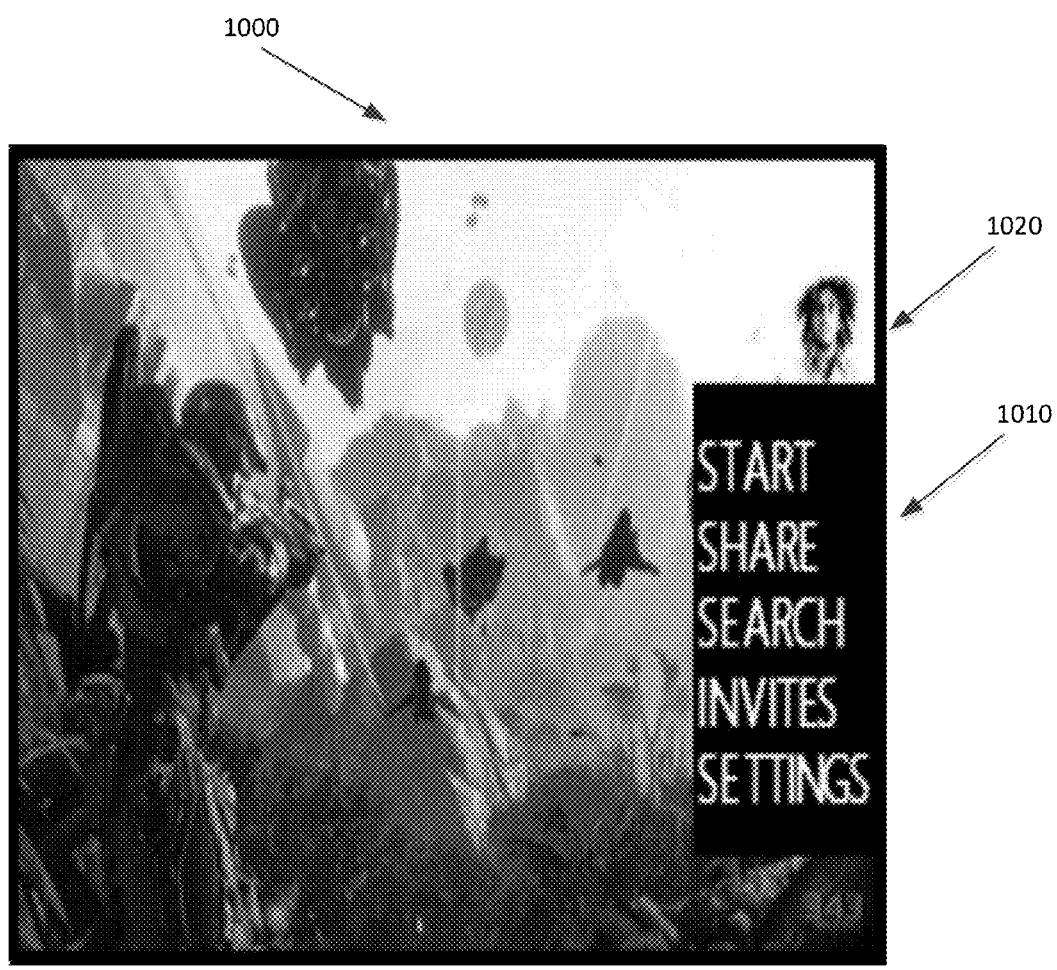
FIG. 10 illustrates an example screen shot from a video game.

FIG. 10 illustrates an example game screen 1000 where the game is still in progress and where a menu 1010 has been presented along with indicia 1020 of a current association. The indicia 1020 may be, for example, a photograph stored in a user profile. The menu 1010 may be used to identify a different user to associate with a controller or to identify a different controller to associate with a user.

Figure 11:
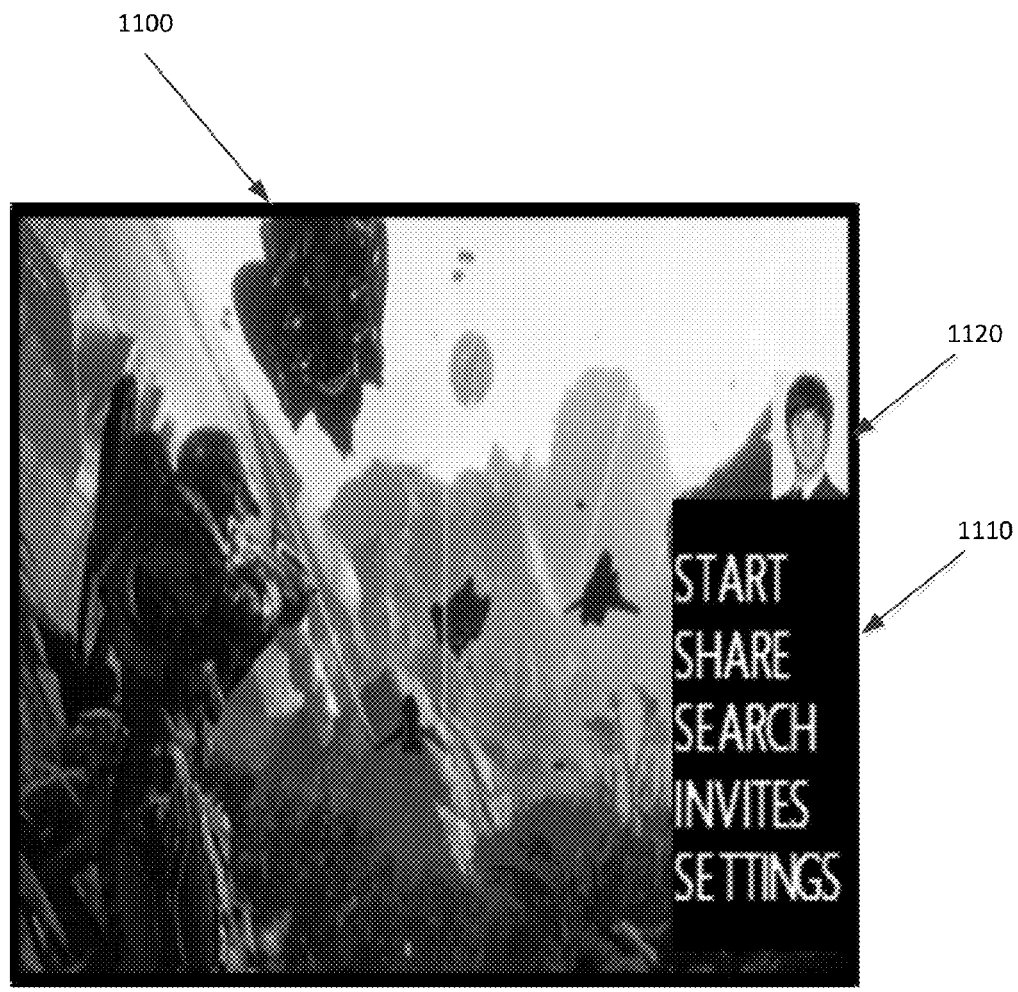
FIG. 11 illustrates an example screen shot from a video game.

FIG. 11 illustrates an example game screen 1100 where the game is still in progress but where a menu 1110 is still present, along with indicia 1120 about an updated association. The indicia 1120 may be, for example, a photograph stored in a different user profile. The indicia 1120, which is different from indicia 1020 (FIG. 10), indicates that the association has been changed without having to terminate the game. In a multi-user multi-screen game, only the screen associated with the user who is updating their controller may see the menu 1110 and the indicia 1120. Other gamers at other screens may not see the menu 1110 and may not have their experience interrupted in any way.

Different users may have different profiles. A user profile may describe, for example, user attributes and user state. User attributes may include, for example, name, language preferences, or other data. User state may include, for example, location, or other data. When there are multiple users signed into a system, there are multiple user profiles available to the system. Conventionally, when a game started, a user signed in from a particular controller using their profile. However, the slot to controller relationship had already been established and fixed. The profile may have controlled, at least in part, the operation of the application. For example, a first user profile may have caused an application to produce an English language presentation for a male who is an intermediate level swordsman while a second user profile may have caused an application to produce a French language presentation for a female who is an expert archer. The profile may have controlled in-game attributes (e.g., point of view, character) but may also have controlled other attributes (e.g., billing, data plan usage). The associations between slot and controller and between slot and user profile were established once when the game started and could not be changed. Example systems use a dynamic interface that can be presented when a game is in progress to establish and re-establish a mapping between a player and a profile and between a profile and a controller.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
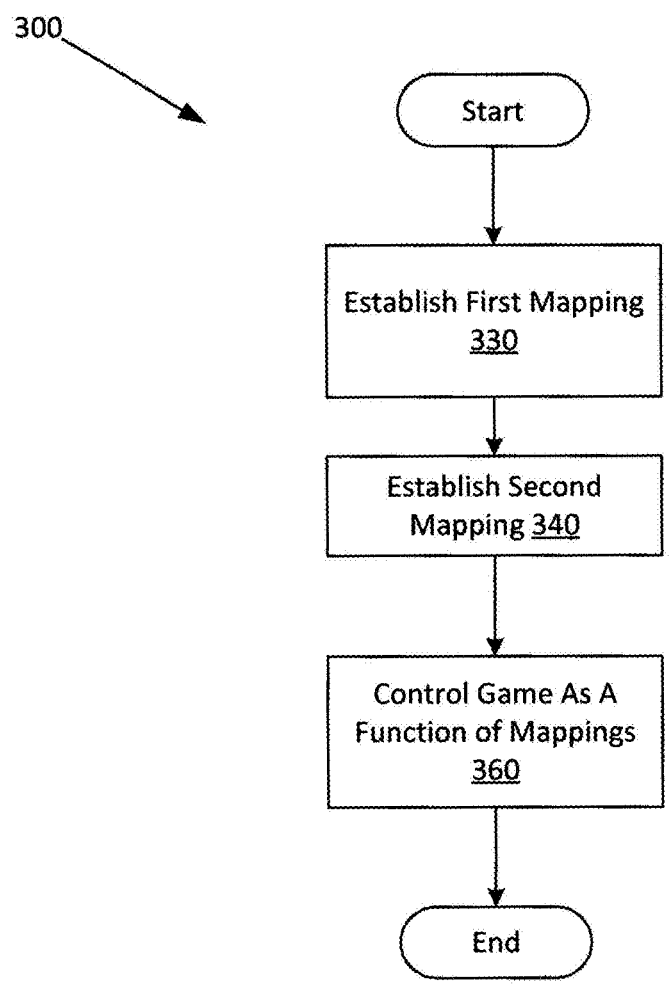
FIG. 3 illustrates an example method associated with managing controller pairings.

FIG. 3 illustrates an example method 300 associated with managing controller pairings. In different examples, method 300 may be performed on a single device, may be performed partially or completely in the cloud, may be performed on distributed co-operating devices (e.g., console and controller), or may be performed other ways. In different examples, method 300 may be performed on devices including, but not limited to, a game console, a computer, a laptop computer, a tablet computer, a phone, and a smart phone.

Method 300 may be performed in an apparatus that is part of a multi-user computer environment. The environment may include a game console and a set of game controllers operably connected to the game console. In one embodiment, a member of the set of controllers may function as the game console. In one embodiment, the set of controllers may include a controller(s) that is directly connected to the console. In another embodiment, the set of controllers may include a controller(s) that is wirelessly connected to the console. In yet another embodiment, the set of controllers may be a heterogeneous set of controllers, some of which are directly connected and some of which are wirelessly connected. The heterogeneous set of controllers may include different types of controllers (e.g., keypad based, button based, steering wheel, inertial control).

Method 300 may include, at 330, establishing a first mapping for a game running on the game console. The mapping may be established in a memory. The memory may be located in the console, in a controller, or in some other computer memory. The first mapping relates a generic player position associated with the game to a user profile. The relation may be established using a data structure (e.g., table 200, list, linked list, database record, record). In one example, the first mapping may depend, at least in part, on first mapping data provided to the game through a user interface available during the game. The first mapping data may include an identifier of a user profile. The identifier may be, for example, a user name, a user account number, a biometric signature, or other identifier.

Method 300 also includes, at 340, establishing, in the computer memory, a second mapping for the game. The second mapping relates the user profile to a member of the set of game controllers. The second mapping may be stored, for example, in table 210. Thus, the first mapping involves the user profile and the generic player position while the second mapping involves the user profile and an identifier of a controller currently in use. The two mappings are user-centric, as opposed to slot centric or controller centric. The user profile is used to connect a generic player slot and a controller currently in use. Since the user profile is connected to the generic player slot, the controller in use can be changed without disrupting the game. Inputs to the generic player slot will still come from the same user so the interface to the game remains unchanged even while a controller in use may change. Since the mappings are user-centric, they provide more flexibility than the conventional mappings. In one embodiment, the second mapping depends, at least in part, on second mapping data provided to the game through the user interface. The user interface is available during the game and thus the mapping can be updated while the game is in progress.

Method 300 also includes, at 360, controlling the game as a function of the first mapping and the second mapping. The control includes managing controller pairings so that actions performed at a controller will be attributed to the appropriate generic player position and the appropriate user profile. When an action occurs at a controller that is currently in use, the controller to user mapping is consulted to find out which user is associated with the controller. The user to slot mapping is then consulted to find out to which player slot the action or data associated with the action is to be provided. In one embodiment, the controller pairings may be managed while the game is in progress.

A user profile may include an attribute and a state. The attribute may describe data that is relatively unchanging for a user. The attribute may be, for example, a user name, a screen name, a data plan identifier, a billing identifier, an account identifier, a parental control setting, a display preference, or a social media data. Different profiles may include a greater or smaller number of attributes. The state may describe data that changes more frequently for a user. The state may be, for example, a location, a data plan balance, a billing balance, an account balance, an experience level, an access time, an engaged time, a location, or a connectivity level. Different profiles may include a greater or smaller number of state variables. In one embodiment, the user profile may be associated with a registered user or with a guest user.

Figure 4:
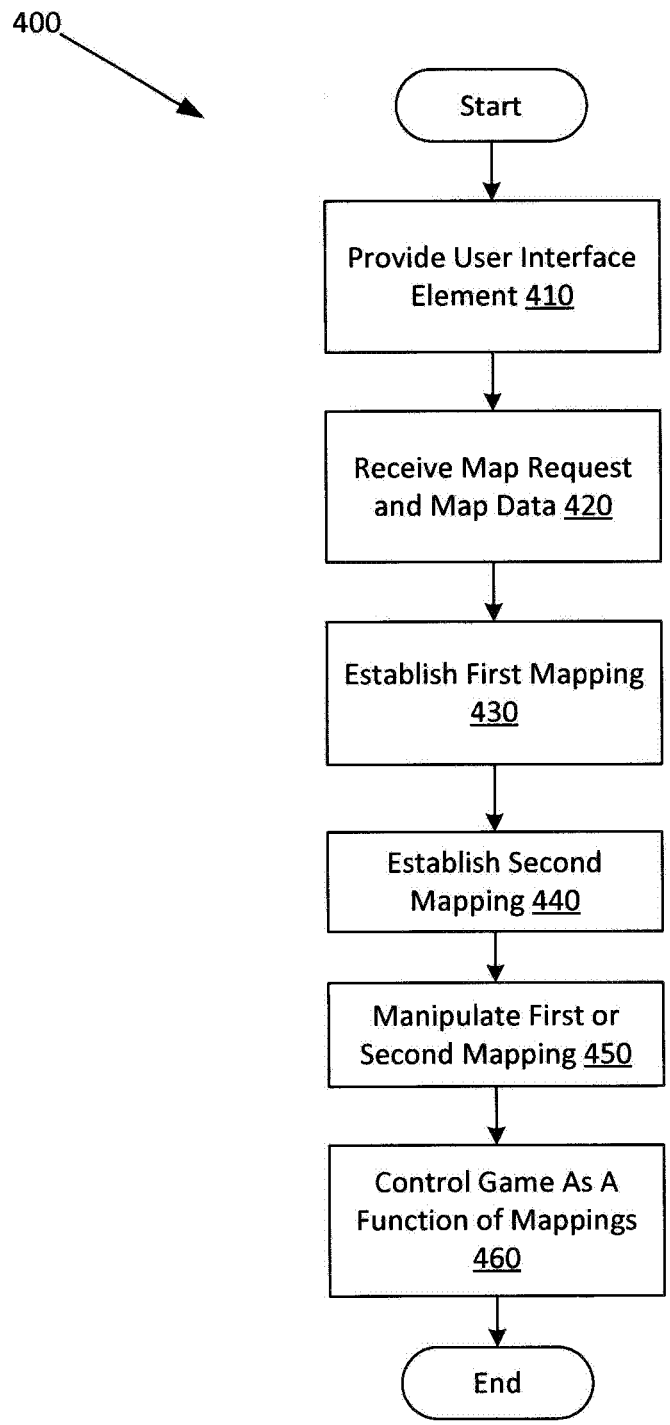
FIG. 4 illustrates an example method associated with managing controller pairings.

FIG. 4 illustrates a method 400 associated with managing controller pairings. Method 400 includes some actions similar to those in method 300 (e.g., 430, 440, 460), but also includes additional actions. For example, method 400 also includes, at 410, providing a user interface element for the game. In one embodiment, the user interface element may be configured to receive a map request and a map data. The user interface element may take different forms including, but not limited to, a graphical user interface element, a tangible interface element, a gesture identifying element, a voice command recognizing element, a natural user interface element, or a haptic interface element. Thus, providing the user interface element may include displaying a menu, manipulating a tangible button or key, controlling a speaker system to produce machine generated spoken words, or other actions. In one embodiment, the user interface element may be a graphical user interface element (e.g., menu) that is provided on a display provided by the console. In another embodiment, the user interface element may be provided on a display provided by a controller. The menu may be displayed without stopping or interrupting game play. In one embodiment, providing the tangible interface element comprises mapping an interaction on a physical interface element(s) on a member of the set of controllers to a map function. For example, two consecutive taps on a first button followed by a clockwise rotation of a dial followed by two more consecutive taps on the first button may be programmed to produce the menu associated with the map function.

Method 400 also includes, at 420, receiving a map request and map data. The map request may indicate that a user to controller pairing is to be changed. The map data may identify the user or the controller. The map request may trigger a manipulation of the first mapping or the second mapping. The map data may be used to update or replace data stored in the computer memory.

Method 400 also includes, at 450, selectively manipulating the first mapping or the second mapping as a function of the map request or the map data. Selectively manipulating the first mapping or the second mapping may include updating or replacing data stored in the computer memory. For example, a controller identifier stored in the second mapping may be replaced with a controller identifier provided in the map data. The controller identifier may be, for example, a user name, a user number, or other identifier.

In one embodiment, manipulating the first mapping or second mapping at 450 may be performed while the game is in progress without interrupting the game experience. In one embodiment, manipulating the first mapping or second mapping at 450 may be performed while the game is in progress without terminating a process running the game. Thus, unlike conventional systems, controller pairings may be manipulated without stopping, interrupting, disrupting, or terminating a game in progress on a game console. While a game is described, the dynamic mapping and remapping may be extended to non-gaming applications.

While FIGS. 3 and 4 illustrates various actions occurring in serial, it is to be appreciated that various actions illustrated in FIGS. 3 and 4 could occur substantially in parallel. By way of illustration, a first process could provide a user interface element, a second process could process a map request, a third process could process map data, and a fourth process could dynamically manage controller pairings. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 and 400. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, ROM, and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 5:
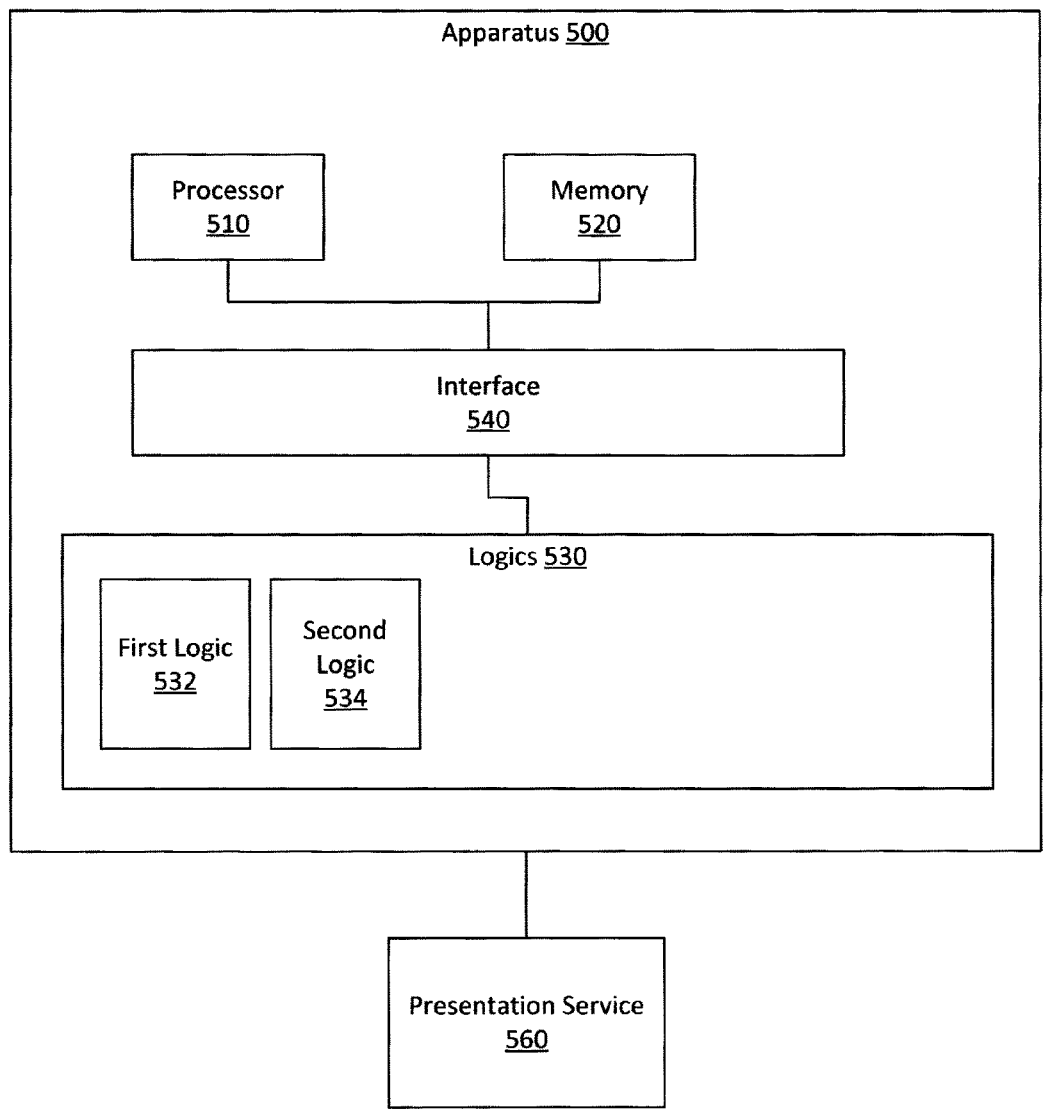
FIG. 5 illustrates an example apparatus configured to manage controller pairings.

FIG. 5 illustrates an apparatus 500 that includes a processor 510, a memory 520, a set 530 of logics, and an interface 540 that connects the processor 510, the memory 520, and the set 530 of logics. The memory 520 may be configured to store information concerning a current mapping between a player position and a player profile and between a player profile and a controller in use. In one embodiment, memory 520 may store mapping data for managing a dynamic user-centric controller pairing for a system that is operably connected to a controller input device that provides input to a multi-user application running on the system. In one embodiment, the mapping data may be stored in tables like game table 200 and controller table 210.

The set 530 of logics may be configured to establish and maintain (e.g., update, re-establish) the mappings. The set 530 of logics may be configured to manage the controller pairing based, at least in part, on the mapping data. In one embodiment, the set 530 of logics manage the controller pairing while the multi-user application is active. Managing the controller pairing may facilitate attributing an action performed at a controller with a player slot via a user profile.

Apparatus 500 may be, for example, a game console, a device acting as a game console, a computer, a laptop computer, a tablet computer, a personal electronic device, a smart phone, a system-on-a-chip (SoC), or other device that can access and process data. In one embodiment, the apparatus 500 may be a general purpose computer that has been transformed into a special purpose computer through the inclusion of the set 530 of logics. Apparatus 500 may interact with other apparatus, processes, and services through, for example, a computer network.

The set 530 of logics may include a first logic 532 that is configured to present a user interface for acquiring a mapping request and the mapping data. In one embodiment, the first logic 532 is configured to present the user interface as a graphical user interface element while maintaining an experience associated with the multi-user application. In one embodiment, the first logic 532 is configured to acquire mapping data for establishing or manipulating the mappings. The mapping data may include, for example, information describing a first relationship between the player slot and the user profile. The mapping data may also include, for example, information describing a second relationship between the user profile and the controller in use. Once the first logic 532 has acquired the mapping data, the first logic 532 may store the information describing the first relationship in a first data structure in the memory 520 and may store the information describing the second relationship in a second data structure in the memory 520. The data structure may be, for example, a database record, a database table, a table, a list, or other data structure.

In one embodiment, the first logic 532 may be configured to selectively present a first user interface to a first user viewing a first display of the multi-user application. The first logic 532 may simultaneously maintain a second different point of view of the multi-user application for a second user viewing a second different display of the multi-user application. This facilitates supporting a multi-user experience where the game experience of a second user is not affected by updating the mapping for the first user.

The set 530 of logics may also include a second logic 534 that is configured to manage the controller pairing as a function of the mapping data and the mapping request. Managing the controller pairing may include establishing, updating, or otherwise manipulating data used for the mappings that support the controller pairing. In one embodiment, the second logic 534 may be configured to dynamically manage the controller pairing by selectively providing, to the multi-user application, data linking information in the first data structure to information in the second data structure. For example, the second logic 534 may use the user profile to identify a controller in use and a game slot in use to facilitate pairing the controller to the player slot.

In different embodiments, some processing may be performed on the apparatus 500 and some processing may be performed by an external service or apparatus. Thus, in one embodiment, apparatus 500 may also include a communication circuit that is configured to communicate with an external source to facilitate accessing or processing action data, user data, player profile data, or other data associated with relating a player, a profile, and a controller in use. In one embodiment, the set 530 of logics may interact with a presentation service 560 to facilitate displaying data using different presentations for different devices.

Figure 6:
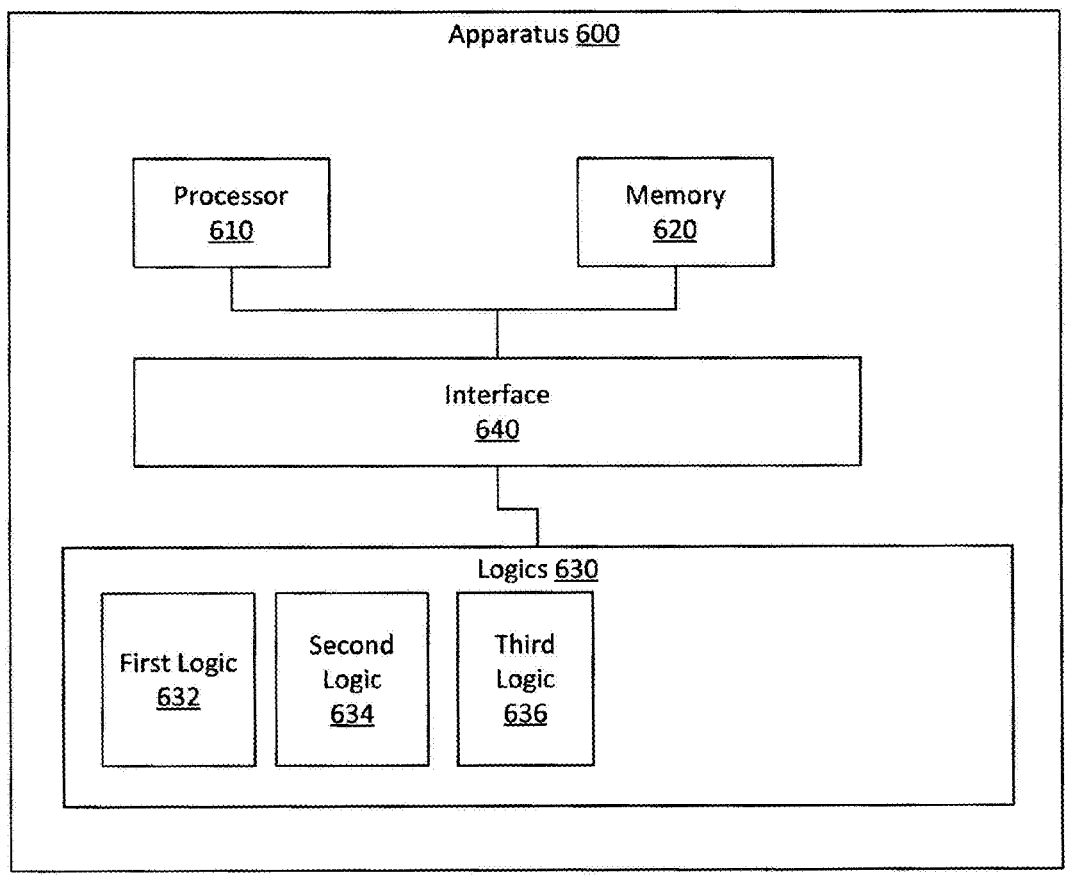
FIG. 6 illustrates an example apparatus configured to manage controller pairings.

FIG. 6 illustrates an apparatus 600 that is similar to apparatus 500 (FIG. 5). For example, apparatus 600 includes a processor 610, a memory 620, a set of logics 630 that correspond to the set of logics 530 (FIG. 5), and an interface 640. However, apparatus 600 includes an additional third logic 636. The third logic 636 may be configured to acquire mapping data. The mapping data may include information describing the first relationship between the player slot and the user profile. The mapping data may also include information describing the second relationship between the user profile and the controller in use. Once the third logic 636 has acquired the mapping data, third logic 636 may store the information describing the first relationship in a first data structure in the memory and may store the information describing the second relationship in a second data structure in the memory. In one embodiment, the third logic 636 may acquire the mapping data through a tangible interface element, a gesture identifying element, a voice command recognizing element, a natural user interface element, or a haptic interface element.

Figure 7:
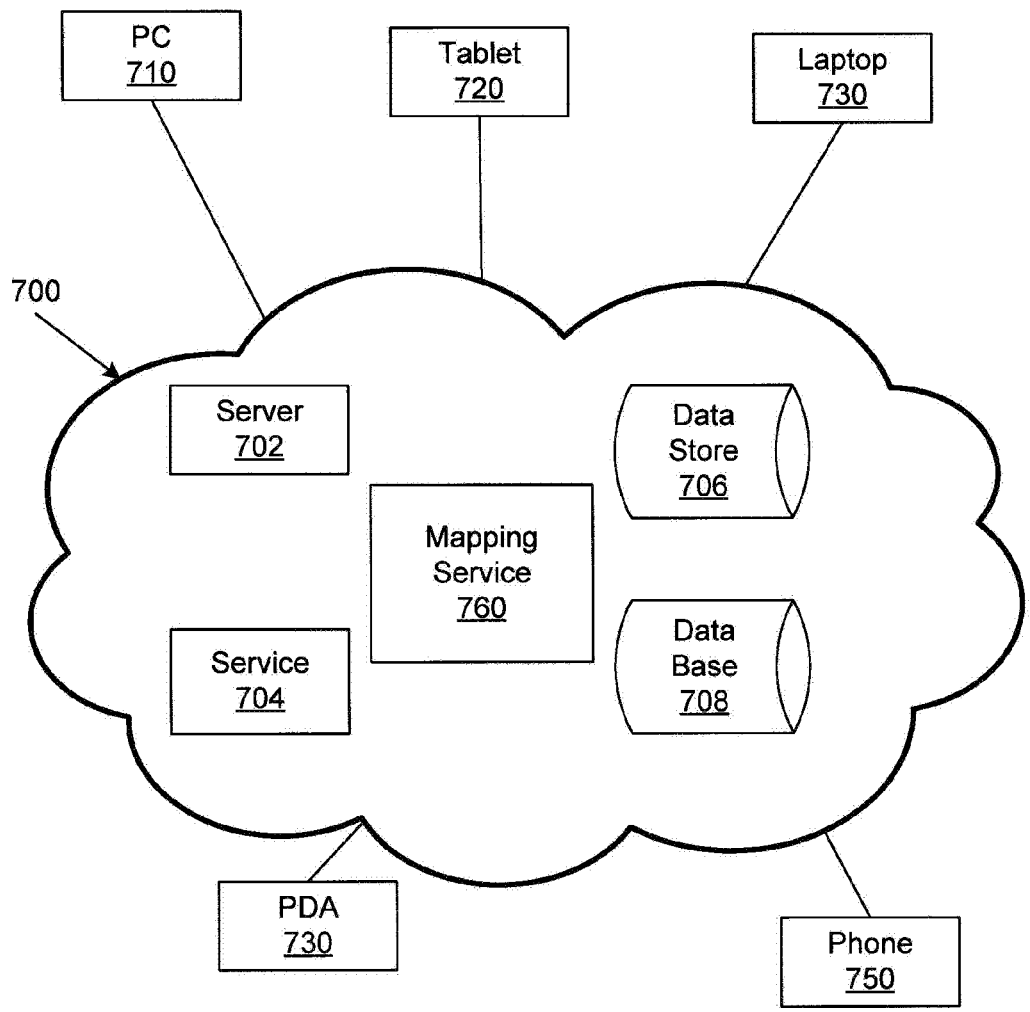
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example mapping service 760 residing in the cloud. The mapping service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the mapping service 760.

FIG. 7 illustrates various devices accessing the mapping service 760 in the cloud. The devices include a computer 710, a tablet 720, a laptop computer 730, a personal digital assistant 740, and a mobile device (e.g., cellular phone, satellite phone, wearable computing device) 750. The mapping service 760 may store, access, or process action data, user data, mapping data, or other data associated with connecting a user, a profile, and a controller in a dynamic manner where re-associations can be made without interrupting or terminating game play or a game.

It is possible that different users at different locations using different devices may access the mapping service 760 through different networks or interfaces. In one example, the mapping service 760 may be accessed by a mobile device 750. In another example, portions of mapping service 760 may reside on a mobile device 750. In one example, mapping service 760 may dynamically present a user interface for accepting a mapping request and mapping data. The mapping data may be, for example, a user profile to associate with a controller or a controller to associate with a user profile. The re-associating may allow flexibility (e.g., switching controllers, switching interaction approach) that is not present in conventional systems.

This flexibility enhances the gaming experience because it allows a player to switch controllers without interrupting game play. A player may wish to switch controllers for a number of reasons. For example, the battery may be running low in a controller or the user may have spilled their coffee on the controller. A controller may simply break, or a user may feel like the controller is bad luck. A better controller may become available, either from the store, or when a friend who has a better controller arrives. A player may start a game using a directly connected (e.g., wired) controller but may want to play in a different room and thus may switch to a wireless controller. Different controllers may be more appropriate at different times. For example, in a fishing game, a button based keypad may be best for navigating a global positioning system (GPS) to determine where to go fishing, a steering wheel may be best for steering the boat, and then a wand-like controller with accelerometers and gyroscopes to provide input to the game and a vibration element for providing output from the game may be appropriate. Thus, a user may want to switch controllers for several reasons.

Figure 8:
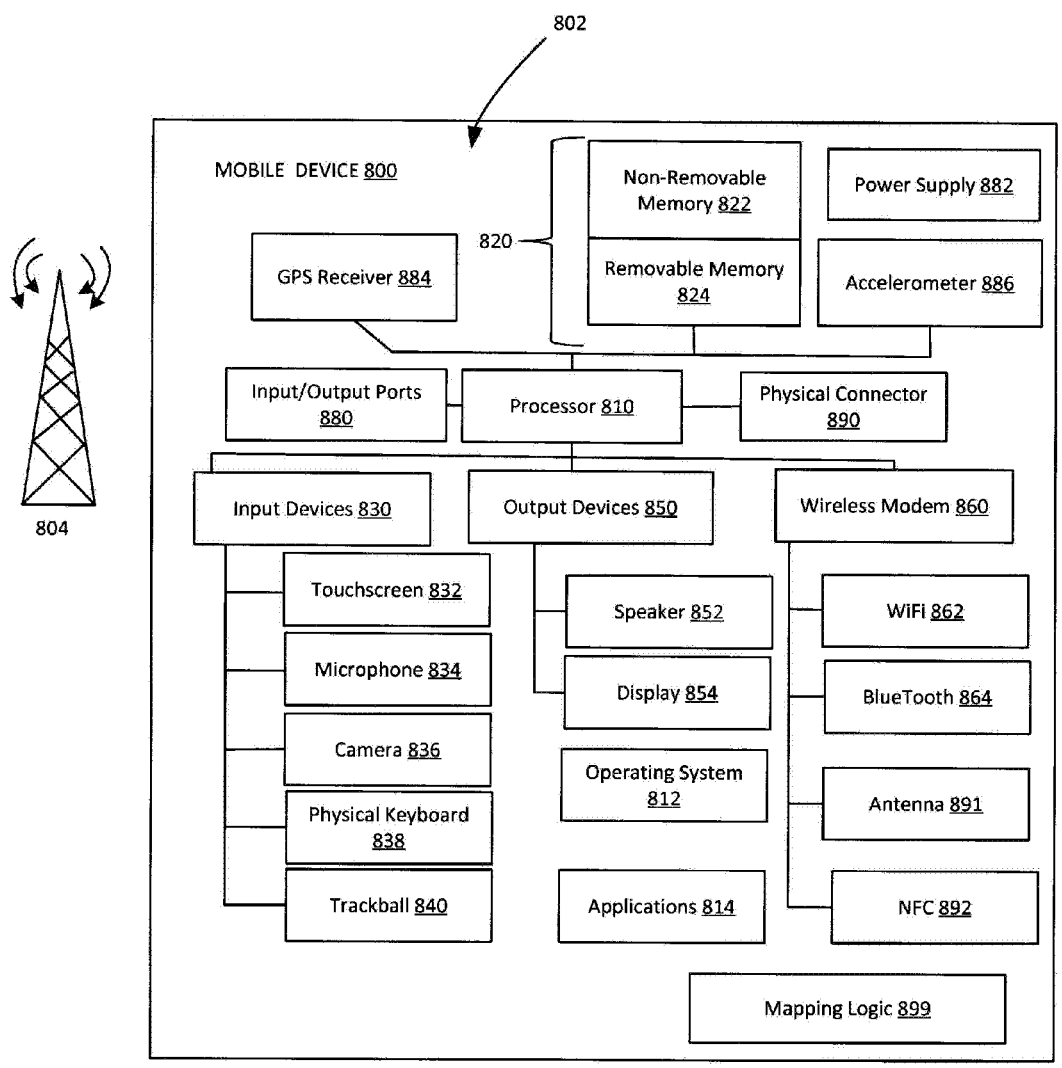
FIG. 8 is a system diagram depicting an exemplary mobile communication device configured to participate in managing controller pairings.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite networks.

Mobile device 800 may function as either a game console or as a game controller. Years ago, a game system may have included just a console and two directly connected, keypad-based controllers. The console would produce a game screen that was displayed on a single screen. Later game systems became multi-locational, where different players could have their own screens, their own controllers, and potentially even their own consoles and yet still play together. There would still be some single or central point of control to co-ordinate the game experience and to keep the game synchronized. Controllers still tended to be button-based and input only. Game systems evolved to where the "console" may be a dedicated console, a personal computer, a laptop, a tablet, a phone, or even a device like mobile device 800. Additionally, the mobile device 800 may provide a screen for displaying the game or a portion of the game. In these later games, controllers were used both for input and output.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include gaming applications, mobile computing applications (e.g., email applications, calendars, contact managers, web browsers, messaging applications), or other computing applications. In different embodiments, mobile device 800 may function as a game console or game controller.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can store data or code for running the operating system 812 and the applications 814. Example data can include web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 may include speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Near field communication (NFC) element 892 facilitates having near field communications.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a mapping logic 899 that is configured to provide a functionality for the mobile device 800. For example, mapping logic 899 may provide a client for interacting with a service (e.g., service 760, FIG. 7). Portions of the example methods described herein may be performed by mapping logic 899. Similarly, mapping logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    in a multi-user computer environment comprising a game console and a set of game controllers operably connected to the game console:
        establishing, in a first data structure in computer memory, a first mapping for a game running on the game console, where the first mapping relates a player slot associated with the game to a user profile comprising an attribute and a state, where the first mapping depends, at least in part, on first mapping data provided to the game through a user interface available during the game;
        establishing, in a second data structure in computer memory, a second mapping for the game, where the second mapping relates the user profile with a member of the set of game controllers, where the second mapping depends, at least in part, on second mapping data provided to the game through the user interface available during the game;
        providing a user interface element for the game, the user interface element being configured to receive a map request and a map data;
        selectively providing, to the game, data linking information in the first data structure to information in the second data structure;
        selectively manipulating the first mapping or the second mapping as a function of the linking data and the map request or the map data without interrupting the game; and
        controlling the game, as a function of the first mapping and the second mapping, by managing controller pairings to attribute actions performed at the member of the set of game controllers with the player slot and the user profile, where the controller pairings are managed while the game is in progress.

2. The method of claim 1, comprising dynamically manipulating the second mapping while the game is in progress without terminating a process running the game.

3. The method of claim 1, the user interface element being provided on a display provided by the game console or on a display provided by a member of the set of game controllers.

4. The method of claim 1, where a member of the set of game controllers functions as the game console.

5. The method of claim 1, where the set of game controllers is a heterogeneous set of game controllers.

6. The method of claim 1, the computer memory being located in the game console.

7. The method of claim 1, the user profile being associated with a guest user.

8. The method of claim 1, wherein the attributes comprise one or more of a data plan identifier, a billing identifier, an account identifier, a parental control setting, a display preference, and a social media data and the state being one or more of a data plan balance, a billing balance, an account balance, an experience level, an access time, an engaged time, and a connectivity level.

9. The method of claim 1, where the user profile is associated with a registered user.

10. A hardware-based processor-readable storage device not consisting of a signal and storing processor-readable instructions that, when executed by a processor in a multi-user computer environment comprising a game console and a set of game controllers operably connected to the game console, cause the processor to:
    provide a user interface element for a game running on the game console, the user interface element being configured to receive a map request and a map data;
    establish, in a first data structure in a computer memory, a first mapping for the game, where the first mapping relates a player slot associated with the game to a user profile, where the first mapping depends, at least in part, on first mapping data provided to the game through a user interface available during the game, and where the user profile comprises an attribute and a state;
    establish, in a second data structure in the computer memory, a second mapping for the game, where the second mapping relates the user profile to a member of the set of game controllers, where the second mapping depends, at least in part, on second mapping data provided to the game through the user interface;

selectively provide, to the game, data linking information in the first data structure to information in the second data structure;

selectively manipulate the first mapping or the second mapping as a function of the linking data and the map request or the map data; and control the game, as a function of the first mapping and the second mapping, to manage controller pairings to attribute actions performed at the member of the set of game controllers to the player slot and the user profile, where the controller pairings are managed while the game is in progress, where the first mapping or the second mapping may be dynamically manipulated while the game is in progress without interrupting the game or without terminating a process running the game.

11. An apparatus, comprising:

a processor;

a memory that stores mapping data for managing a dynamic user-centric controller pairing for a system operably connected to a controller input device that provides input to a multi-user application running on the system;

a set of logics stored on the memory, the set of logics managing the controller pairing based, at least in part, on the mapping data, where the set of logics manages the controller pairing while the multi-user application is active, where managing the controller pairing facilitates attributing an action performed at the controller in use with a player slot via a user profile, where the user profile is associated with a registered user or a guest user; and an interface to connect the processor, the memory, and the set of logics;

the set of logics comprising:

a first logic that:

presents a user interface as a graphical user interface element while maintaining an experience associated with the multi-user application for acquiring a mapping request and the mapping data, where the first logic acquires the mapping data, the mapping data including information describing a first relationship between the player slot and the user profile and describing a second relationship between the user profile and the controller in use;

stores the information describing the first relationship in a first data structure in the memory; and stores the information describing the second relationship in a second data structure in the memory;

a second logic that dynamically manages the controller pairing as a function of the mapping data and the mapping request, by selectively providing, to the multi-user application, data linking information in the first data structure to information in the second data structure; and a third logic that:

acquires the mapping data, where the mapping data includes information describing the first relationship between the player slot and the user profile and describing the second relationship between the user profile and the controller in use;

stores the information describing the first relationship in the first data structure in the memory; and stores the information describing the second relationship in the second data structure in the memory, where the third logic acquires the mapping data through an electric field sensing electrode electroencephalography (EEG) interface element, or a piezoelectric interface element and a tangible interface element.

12. The apparatus of claim 11, the first logic being configured to selectively present a first user interface to a first user viewing a first display of the multi-user application while maintaining a second different point of view of the multi-user application for a second user viewing a second different display of the multi-user application.

* * * * *